March 14, 1939. G. L. DIMMICK Re. 21,029

METHOD OF AND MEANS FOR RECORDING SOUND

Original Filed June 4, 1931

INVENTOR.
Glenn L. Dimmick.
BY J. R. Goldsborough
HIS ATTORNEY.

Reissued Mar. 14, 1939

Re. 21,029

UNITED STATES PATENT OFFICE 21,029

METHOD OF AND MEANS FOR RECORDING SOUND

Glenn L. Dimmick, Audubon, N. J., assignor, by mesne assignments, to Radio Corporation of America, New York, N. Y., a corporation of Delaware Original No. 1,999,721, dated April 30, 1935, Serial No. 541,976, June 4, 1931. Application for reissue July 16, 1935, Serial No. 31,696

14 Claims. (Cl. 179—100.3)

Figure 1:
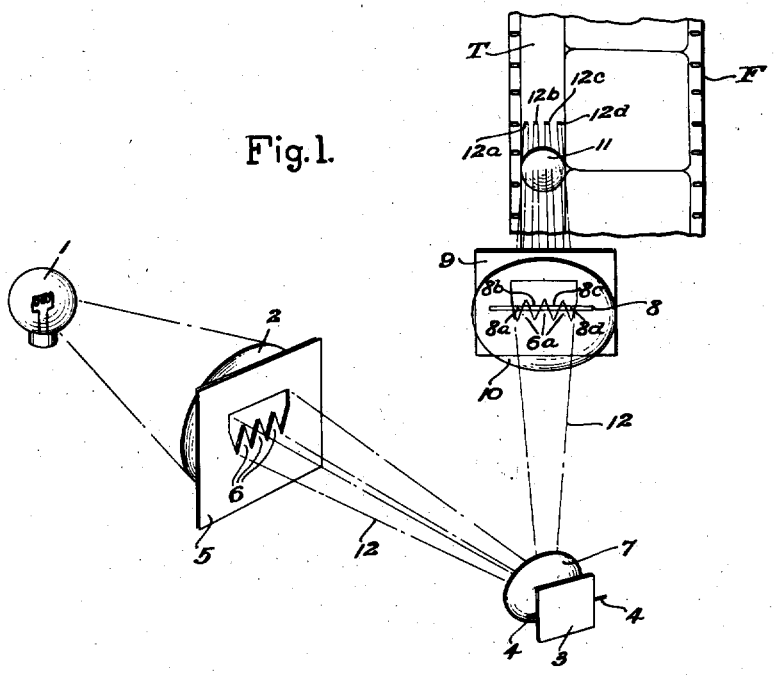

My invention relates to the recording of sound upon a moving strip of light sensitive material, and, more particularly, to a system for simultaneously recording a plurality of identical sound tracks on a moving photographic film.

In reproducing sound from a film of this type, the film is passed from a feed drum or reel, past a fine line of light extending in a direction transverse to the direction of travel of the film, and thence to a take-up reel onto which the film is wound. Heretofore, it has been common practice, according to one well known method, to record the sound on the film in the form of a single sound trace or line, part of which is substantially uniformly transparent and part of which is substantially uniformly opaque, each part varying in area in accordance with the recorded sound. To obtain faithful reproduction of the sound from a record of this kind, it is essential that the reproducing light beam extend over the full width of the sound track on the film. It happens occasionally, however, that the reproducing light beam does not completely cover the sound track as, for example, due to a slight movement of the film transversely of the direction in which it is fed as above described, or due to accumulation of dirt or other foreign matter in the reproducing slit, and in such cases, there results distortion of the reproduced sound.

Another disadvantage of a single trace record produced according to the variable area method above described resides in the fact that the peaks of the high frequency waves usually are somewhat under-exposed at large amplitudes. This results in cutting off a portion of the high frequency response during reproduction and constitutes another source of imperfect reproduction. Obviously, therefore, it is desirable, in this method of recording, that the density of the film be independent of the amplitude of the recorded wave and as uniform as possible.

In accordance with my invention, I record the sound within the space or track allotted to a record of a single sound line, but instead of recording the sound in the form of a single sound line, I record it in the form of a plurality of substantially identical sound lines, each being a true representation of the wave form of the recorded sound but having an amplitude smaller than a record of a single sound line. Thus, should the reproducing light beam fail to completely cover the sound track for any reason, or should the light beam reaching the film not be uniform, little or no appreciable distortion results when using a record according to my invention, since each section of my multiple sound line record is an independent record of the recorded sound. Furthermore, since the sound is recorded in a plurality of lines within the space normally containing a single sound line, as was the practice heretofore, the ratio of the amplitude of each of my plurality of sound lines to the amplitude of the single sound line will be inverse to the ratio of the number of sound lines recorded to the single sound line or unit, the sum of the amplitudes of the plurality of sound lines being equal to the amplitude of the single sound line representing the same recorded sounds. Consequently, the peaks of the high frequency waves of each individual sound line will be much smaller and the exposure much more uniform than in the case of a single sound line record, the distortion resulting from under-exposure of these peaks being greatly diminished. I am thus able to attain the primary object of my invention, namely, to produce a photographic sound record of the variable area type which will not be subject to the disadvantages present in the single sound line records of the type previously employed.

Another object of my invention is to provide a photographic sound record which will not be dependent upon the accurate dimensions of the reproducing light beam for the faithful reproduction of sound therefrom.

Still another object of my invention is to provide a photographic sound record in which the peaks of the high frequency waves will be sufficiently exposed to result in proper reproduction of sound therefrom.

A further object of my invention is to provide a system for recording photographic sound records which will require comparatively less power than required by systems heretofore employed in making records which result in equal or even less fidelity in reproduction.

Still a further object of my invention is to provide a system which may be easily and readily adapted for the recording of photographic sound records which, when reproduced, will result in a minimum of reproduction of ground noise.

Another object of my invention is to provide a sound recording system particularly adapted to record sound on films requiring a track wider than standard tracks.

A further object of my invention is to provide a recording system for the purposes set forth which will be efficient in use, as well as being compact and well suited to the requirements of economical manufacture.

Figure 2:
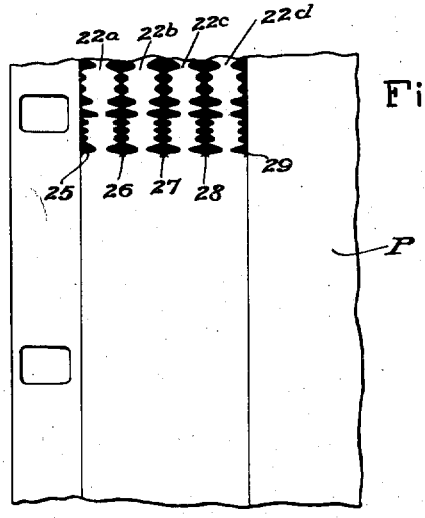

The novel features of my invention are set forth with particularity in the appended claims, the invention itself, however, both as to its organization and method of operation, together with additional objects and advantages thereof, being best understood from the following description of a specific embodiment, when taken in connection with the accompanying drawing in which Figure 1 is a diagrammatic view, in perspective, of a sound recording system according to my invention, and Figure 2 is a fragmentary detail of a positive film which may be printed from the negative made by the system shown in Figure 1.

Referring to the drawing, wherein similar reference characters indicate corresponding parts throughout, there is shown a recording light source in the form of an incandescent lamp 1 which is focused, by means of a suitable lens 2, upon a galvanometer mirror 3, mounted for rotation about an axis 4—4. An opaque light stop 5, having an opening therein into which project the saw-tooth projections 6, for defining a plurality of saw-tooth light beams, is disposed adjacent the lens 2 in the manner shown and is focused, by means of a lens 7, upon a narrow slit 8, formed in an opaque plate or disc 9 and having its axis parallel to the mirror axis 4—4. The galvanometer mirror 3 is focused by means of a lens 10 upon an objective lens 11, which in turn focuses the slit 8 upon the sound track T of a negative film F.

Normally, the light stop 5 is so located that, when there is zero modulation, or when the mirror 3 is stationary, the image 6a of the saw-teeth 6 overlaps the slit 8 in such a position that the slit intersects the altitudes of the small triangular saw-teeth images substantially midway thereof, leaving only the spaces 8a, 8b, 8c, and 8d through which the light may pass, since both the stop 5 and the plate 9 are opaque. The light beam 12 is thus divided into a plurality of beams 12a, 12b, 12c, and 12d which are focused, as above described, onto the sound track T by the objective lens 11, each of the divided beams 12a, 12b, 12c, and 12d individually and independently affecting a portion of the light sensitive track T. As the mirror 3 vibrates about its axis 4—4 in response to sound impulses impressed upon a suitable microphone in circuit therewith (not shown), the image 6a moves up and down across the slit 8, thereby correspondingly shortening or lengthening the spaces 8a, 8b, 8c, and 8d to vary the width of each of the recording beams 12a, 12b, 12c, and 12d. In this manner, as the film F is advanced, a plurality of similar areas on the track T are simultaneously exposed to the effects of the variable recording light beams 12a, 12b, 12c, and 12d, each area resulting in an individual sound line on the track T.

In the drawing, I have shown the saw-tooth stop 5 as cooperating with the light slit 8 to divide the recording light beam 12 into four paths or beams 12a, 12b, 12c, and 12d. Obviously, the beam 12 may be divided into any number of individual beams desired by merely changing the number of saw-teeth shown at 6. As shown in the drawing, the four separate and divided light beams will affect four separate paths on the track T to produce four separate and identical sound lines thereon. When a positive P is printed from a negative F so produced, the resulting record will appear as in Figure 2. The clear areas 22a, 22b, 22c, and 22d correspond, respectively, to the portions on the negative affected by the light beams 12a, 12b, 12c, and 12d, while the opaque or dark portions 25, 26, 27, 28, and 29 correspond to the unaffected portions of the negative track T.

It is well known that during reproduction from a record of the variable area type, the accumulation of foreign matter such as dirt, oil, scratches, etc., on the transparent area of the record results in the production of ground noises. Thus, it is essential that the amount of clear or transparent area be reduced to a minimum if the ground noise is to be reduced. To this end, various proposals have been made, among them being one by which some of the audio frequency current is rectified and the rectified current passed through the galvanometer in such a direction that the recording light beam vibrates about a new mean position on the sound track which is a function of the amplitude of the sound being recorded, where a single sound line is being recorded thereon (see article entitled "Ground noise reduction" appearing on pages 12 to 14 of the Motion Picture Projectionist for March, 1930, Volume 4, #5). The chief disadvantage of this method is that when the modulation is small, the recording is close to the edge of the track, and, in the case of imperfectly adjusted reproducers employing a single sound line record made by this process, it sometimes happens that the scanning beam does not cover the full width of the sound track, as heretofore described. This usually results in distortion due to cutting off of the small amplitude recordings.

According to my invention, I can easily overcome this difficulty by merely placing the stop 5 originally in such a position that, instead of the image 6a of the saw-teeth 6 falling on the slit 8 as above described when there is no modulation, the image 6a will so be caused to fall on the slit 8 that the slit will traverse the image 6a close to the bases of the small triangles. As the amplitude of the recorded signals changes, the rectified A. C. may be caused to shift the position of the image 6a toward or away from the position shown in Figure 1, as the case may be. By positioning the stop 5 in this manner, the beams 12a, 12b, 12c, and 12d are, for small amplitudes, relatively narrower than when the stop 5 is positioned as first described above. Hence, when the positive P is printed, the transparent areas 22a, 22b, 22c, and 22d will be relatively narrower and the opaque areas 25, 26, 27, 28, and 29 will be relatively wider. Due to the decreased clear area on the film resulting thereby, ground noise is materially reduced during reproduction, and at the same time, the distortion, if any, resulting from the fact that the scanning beam does not fully cover the sound track, is greatly reduced because each sound line is a complete, individual, and independent record of the recorded sound, and only one or a portion of one of said individual records may be affected by the improperly positioned scanning beam.

A further advantage resulting from the employment of the recording system according to my invention resides in the saving of power employed to drive the galvanometer mirror. It is well known that the power required for this purpose goes up as the square of the amplitude of the sound recorded. Obviously, where four double sound lines, for example, are formed on the same negative track on which a single sound line of the same sounds is normally recorded, the mirror need be vibrated through only one-eighth the arc normally necessary. This, only one sixty-fourth of the power is required to record the same sounds, and since the amplitudes of all of the sound lines are added during reproduction, the total amplitude resulting will be the same as that of a single line record of the same sounds on a track of the same width as that on which all four double sound lines have been recorded.

It will further be apparent that the sound lines of my invention have a much more uniform exposure at high frequencies than the high frequency waves of the single sound line of a variable area record on the same track resulting in the same output. The exposure of a sound line is dependent upon the cross velocity of the recording beam, which is, of course, at right angles to the direction in which the film F is fed. The maximum cross velocity of the recording light beam is directly proportional to the frequency for a constant amplitude. For a constant frequency, the maximum cross velocity is proportional to the amplitude. It is the effect of the cross velocity, as hereinbefore stated, which is responsible for the under-exposure of the peaks of the high frequency waves and for cutting off a portion of the high frequency response during reproduction. By using a record in which the sound has been recorded in a plurality of sound lines, the effect of cross velocity is reduced in direct proportion to the number of lines in a given sound track width.

From the foregoing description, it will be apparent that a sound record formed in accordance with my invention is particularly useful for wide films such as have come, more or less, into use recently, since such films are particularly difficult to feed through the reproducing apparatus without slight movement to one side or the other. However, it is to be distinctly understood that my invention is not necessarily limited to this type of film. Furthermore, although I have shown and described my invention in connection with a sound recording system, it will be apparent to those skilled in the art that the invention may be advantageously employed in re-recording systems as well as recording systems. I am also fully aware that, although I have shown a certain specific embodiment of my invention, many modifications thereof are possible. The invention is, therefore, not to be restricted except insofar as is necessitated by the prior art and by the spirit of the appended claims.

I claim as my invention:

1. In apparatus for simultaneously forming a plurality of adjacent and identical variable-area sound tracks on a photographic medium, a light source, means responsive to sound for reflecting light from said source, means interposed between said light source and said light reflecting means for dividing a beam of light from said source into a plurality of defined light beams, a photosensitive surface, means interposed between said light reflecting means and said photosensitive surface for modulating the light passing from said light reflecting means to said photosensitive surface, and means for projecting the sound-modulated light beams onto said photosensitive surface.

2. The method of photographically recording sound upon a moving light sensitive element which comprises producing a light beam, dividing said beam into a plurality of discrete minor beams spaced transversely of the direction of movement of said element, directing said plurality of beams toward said element, causing said beams to vibrate bodily in the direction of movement of said element in accordance with the sounds being recorded, and simultaneously causing the effective cross-section of each of said beams to simultaneously and equally vary transversely of the direction of movement of said element in accordance with the amplitude of vibration, whereby a plurality of identical sound lines of the variable area type are synchronously formed upon said element.

3. In apparatus for simultaneously forming a plurality of adjacent and identical variable-area sound tracks on a photographic medium, the combination of a light source, a light reflector disposed angularly with respect to said light source in the path of light therefrom, said reflector being vibratable in accordance with sound impulses to be recorded, means for focusing said light source onto said reflector, a light stop disposed between said light source and said reffector and having a plurality of saw teeth therein for dividing into a plurality of defined light beams the light passing from said light source to said reflector, a light sensitive member, a second light stop disposed between said reflector and said light sensitive member and having a slit therein, means for focusing upon said second light stop, over the slit thereof, an image of the saw teeth of said first named stop, the vibration of said reflector in response to sound impulses producing movement of said defined light beams over said slit whereby to modulate said light beams in accordance with said sound impulses, and means for directing said modulated light beams onto said light sensitive member.

4. In an apparatus for producing on a moving film a photographic sound record of the varying width constant density type, a source of light for producing a light beam impinging on the film, a stationary screen disposed in the path of said light beam and having a rectangular narrow aperture transverse to the direction of movement of the film, a second screen provided with an aperture, two side edges of which converge in said direction, and arranged in the path of said light beam in such position relatively to the first mentioned screen that by means of the said light beam there is formed on one of said screens across the aperture therein an image of the aperture in the other of said screens, and means for relatively vibrating the said image and the last mentioned aperture in the direction of movement of the film depending both on the variation of the form of the sound waves and also on the variation of the intensity of the sound.

5. In an apparatus for producing on a moving film a photographic sound record of the varying width constant density type, a source of light, a mask arranged in the path of light beam from said light source, impinging on the film, and provided with an aperture having two sides making an angle with the length of the film, a second mask disposed in the path of said light beam and therein a narrow stationary rectangular aperture transverse to the length of the film, means for forming an image of one of said apertures on the mask provided with the other aperture and means for causing relative vibration between the said image and the last mentioned mask in the direction of movement of the film depending upon both the variation in the form of the sound waves and on the intensity of the sound.

6. In an apparatus for producing on a moving film a photographic sound record of the varying width constant density type, a source of light for producing a light beam impinging on the film, a stationary screen disposed in the path of said light beam in front of the film and having a rectangular narrow aperture transverse to the length of the film, a mask having an aperture two side edges of which converge in the direction of movement of the film, means for forming on said screen an image of the last mentioned aperture, and means for vibrating the said image in the direction of movement of the film relatively to the rectangular slit depending on the variation of the form of the sound waves and also on the variation of the intensity of the sound.

7. In an apparatus for producing on a moving film a photographic sound record of the varying width constant density type, a source of light for producing a light beam impinging on the film, a mask, a mirror and a screen disposed in the path of said light beam in the order named, said mask having an aperture, two side edges of which converge in the direction of movement of the film, said screen having a narrow rectangular slit transverse to the film, means for forming an image of said aperture on said screen across the rectangular slit therein, and means for vibrating said mirror in the direction of movement of the film and relatively to said slit depending on the variations of the form of the sound waves and also on the intensity of the sound.

8. Apparatus according to claim 7, and in which means are provided for rectifying a portion of the alternating currents representing sounds to be recorded, and means controlled by the rectified current for modifying the relative oscillations of the image of the aperture relatively to the slit in the direction of movement of the film depending on the variation in the intensity of the sounds, the modifications caused by said rectified current varying in inverse proportion with the intensity of the sounds to be recorded.

9. In an apparatus for producing on a moving film a photographic sound record of the varying width constant density type, a source of light, a mask having an aperture having two sides making an angle with the horizontal in the path of the light beam, a screen having a narrow rectangular horizontal slit in the path of the light beam and transverse to the film, means for relatively vibrating the light beam and the mask in the direction of movement of the film and relatively to said slit depending on both the variations in the form of the sound waves and the intensity of the sound.

10. In an apparatus for producing on a moving film a photographic sound record of the varying width constant density type, a source of light, in the path of said light beam a mask, a mirror and a screen, in the order named, said mask having an aperture two sides of which are sloping and make an angle with the horizontal and said screen having a horizontal narrow rectangular slit transverse to the film, and means for vibrating said mirror in the direction of movement of the film and relatively to said slit depending on both the variations in the form of the sound waves and the intensity of the sound.

11. Apparatus according to claim 7 and in which an optical system forms on the screen a reflected image of said aperture with its two sides intersecting the longer sides of the slit at small angles.

12. Apparatus according to claim 7 and in which means are provided for rectifying a portion of the alternating currents representing the sounds to be recorded, and means controlled by the rectified current for modifying the relative oscillations of the beam and mask in the direction of movement of the film dependent on the variations in the intensity of the sounds, the modification caused by said rectified current varying in inverse proportion with the intensity of the sounds to be recorded.

13. Apparatus according to claim 9 in which means are provided for rectifying a portion of the alternating current representing the sounds to be recorded, and means controlled by the rectified current for modifying the relative oscillations of the light beam and mask in the direction of movement of the film depending on the variations in the intensity of the sounds to be recorded.

14. Apparatus according to claim 9 in which means are provided for rectifying a portion of the alternating current representing the sounds to be recorded, and means controlled by the rectified current for modifying the relative oscillations of the light beam and mask in the direction of the movement of the film in the inverse proportion of the intensity of the sounds to be recorded.

GLENN L. DIMMICK.